(No Model.) 2 Sheets—Sheet 2.

G. F. HARDY & R. A. BALDWIN.
EXHIBITOR FOR SHIRTS, &c.

No. 392,797. Patented Nov. 13, 1888.

WITNESSES:
INVENTOR:
ATTORNEYS.

UNITED STATES PATENT OFFICE.

GEORGE HUBBARD HARDY AND ROLLIN ALGER BALDWIN, OF MANCHESTER, NEW HAMPSHIRE.

EXHIBITOR FOR SHIRTS, &c.

SPECIFICATION forming part of Letters Patent No. 392,797, dated November 13, 1888.

Application filed July 24, 1888. Serial No. 280,869. (No model.)

*To all whom it may concern:*

Be it known that we, GEORGE HUBBARD HARDY and ROLLIN ALGER BALDWIN, both of Manchester, in the county of Hillsborough and State of New Hampshire, have invented a new and Improved Exhibitor for Shirts, &c., of which the following is a full, clear, and exact description.

The object of the invention is to provide an exhibitor of simple and durable construction and neat appearance adapted to support shirts, collars, cuffs, and the like, to exhibit the same to the best advantage.

The invention consists in novel constructions and combinations of parts, as hereinafter particularly described, and pointed out in the claims.

Reference is to be had to the accompanying drawings, forming a part of this specification, in which similar letters of reference indicate corresponding parts in both the figures.

Figure 1:
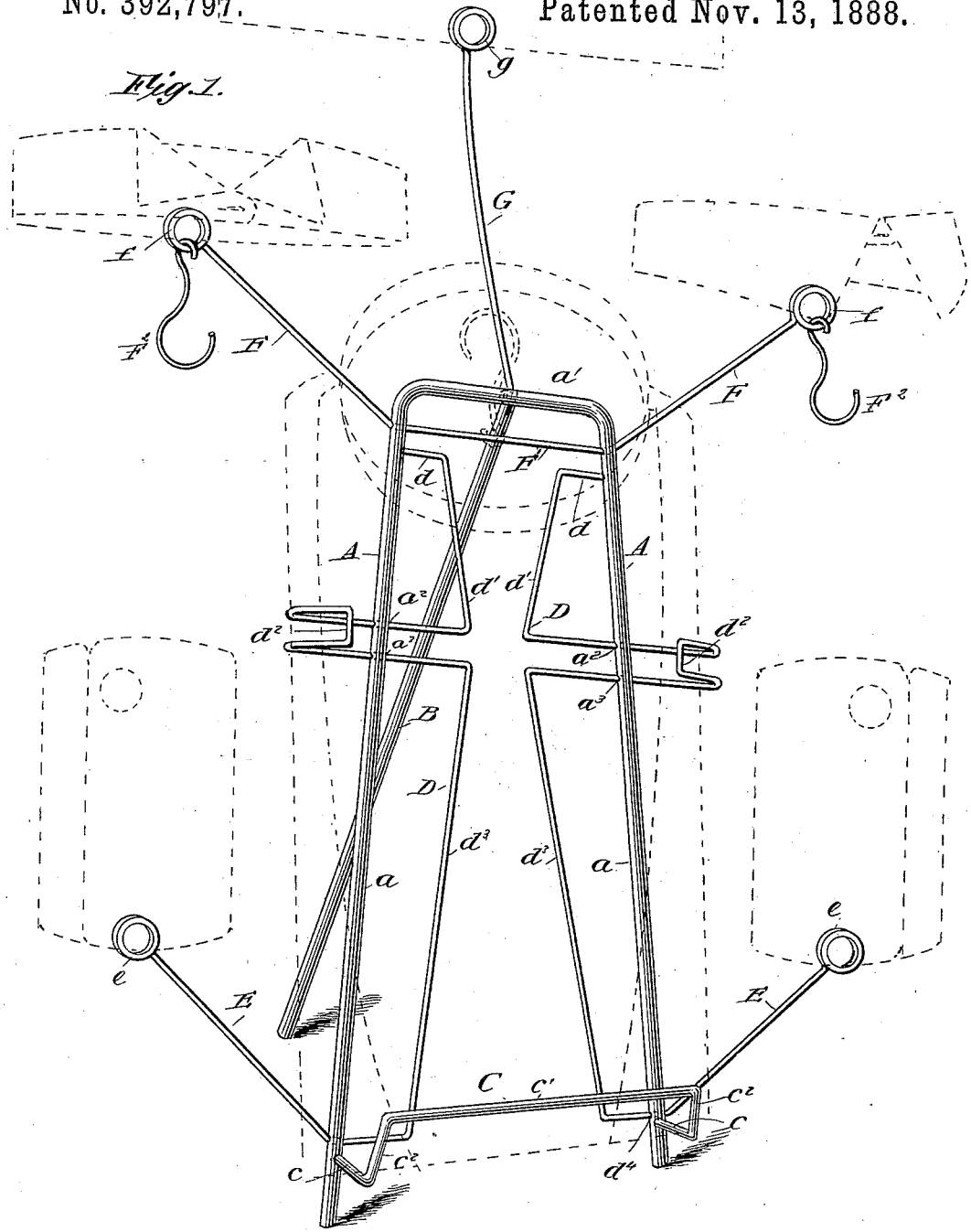
Figure 2:
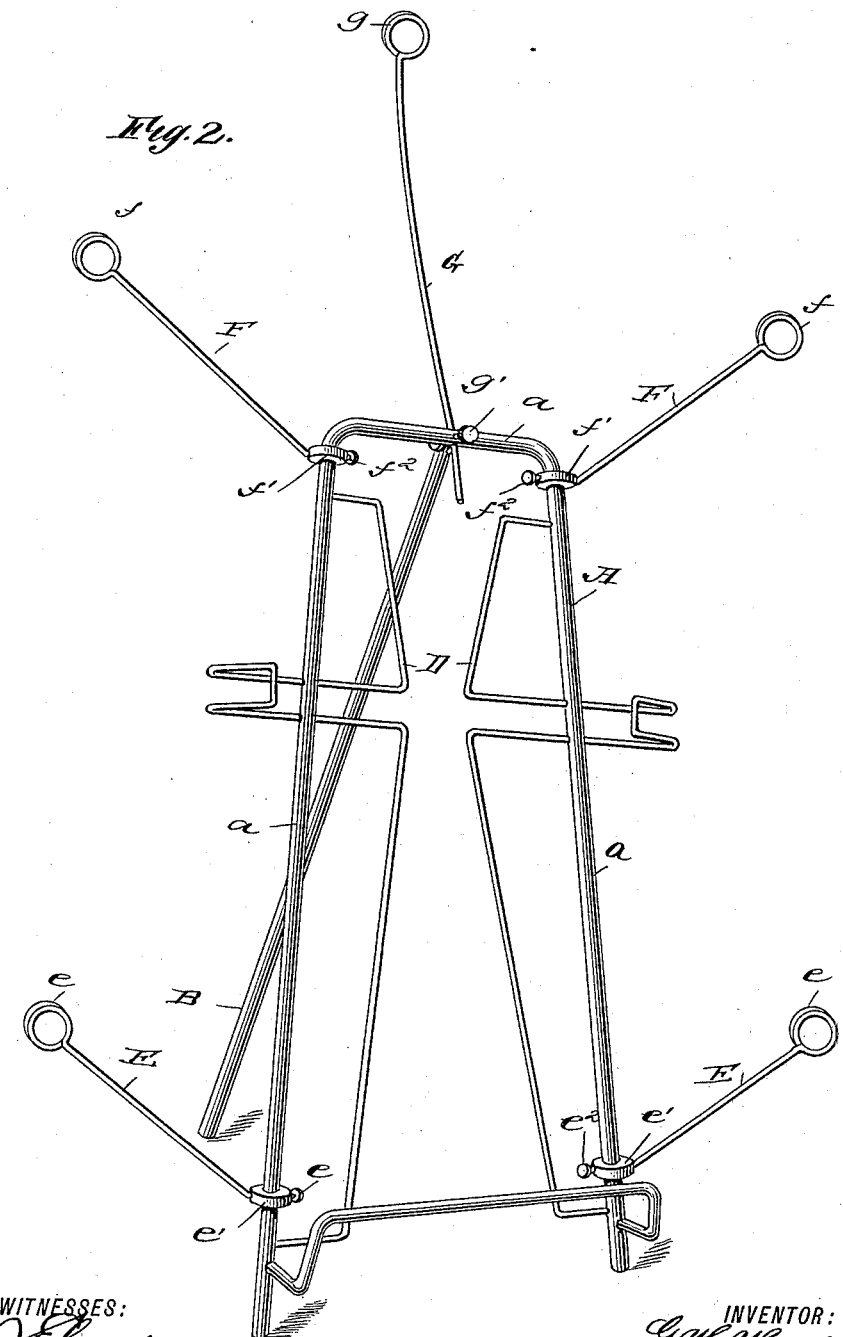

Figure 1 represents in perspective an exhibitor constructed in accordance with our invention, the goods designed to be exhibited being indicated in dotted lines, and Fig. 2 is a perspective view of a modified construction, to be hereinafter referred to.

Referring particularly to Fig. 1 of the drawings, the main frame A of the exhibiting-stand consists of the side members or legs, $a$, united at the top by a cross-bar, $a'$, which main frame is supported in the raised position by a leg, B, hinged to the cross-bar $a'$ of the main frame A at the back thereof.

At or near the bottom a support, C, for the bottom of a shirt, is secured to the side legs of main frame A, the support consisting of a wire bar or rod extending across the main frame and bent bodily outward and upward, forming the seat $c$ $c$, the cross-bar $c'$, and vertical members $c^2$ $c^2$, forming a retainer for the shirt.

A durable and efficient means of clamping the shirt on the main frame A is formed and arranged as follows: Two wires, D D, are secured, respectively, at their upper ends to the side legs or members, $a$, near the top of the latter, and each preferably extended inward for a short distance at about a right angle, as at $d$ $d$, then downward, and preferably inward to slightly incline toward the center of the frame, as at $d'$, then outward through apertures $a^2$, formed in the legs $a$ of the main frame A, and extended a distance beyond the said frame and returned therethrough, as at $a^3$, the loop thus formed being bent over upon itself, thus forming clamps $d^2$ at the side of the main frame, then downward to near the bottom of the legs, as at $d^3$, and extended outward and united to the side legs, $a$, near the bottom, as at $d^4$. The wires D where they pass through the apertures $a^2$ $a^3$ have a loose fit therein, whereby the said wires may be moved outward to separate the clamps $d^2$ to receive a laundered shirt, and upon being released the form of the said wires causes them to have a spring action and they will normally act to clamp the shirt in place.

By causing the clamp-wires D to pass through the main frame the latter affords them a positive guide and a strong support.

We extend the wires D outward through the legs $a$ at the bottom and bend them upward and outward, forming arms E for supporting cuffs or collars, a coil, $e$, formed on the end thereof, forming a clamp between the coils of which the cuff or collar is forced. Additional supports are provided for collars or cuffs by the arms F F, which extend outward from near the top of the legs $a$, the said arms being formed at their ends with coils $f$ for holding the collars or cuffs, and the arms are connected by a cross bar or wire, F'. Hooks F² may be hung on the coils $f$ and used for supporting small articles of neckwear and other apparel. The frame may be suspended from a bracket or other support by a suitable hook engaging the cross-wire F'.

Projecting upwardly from the cross-bar $a'$ of the main frame is another arm, G, formed with a coil, $g$, and which may be employed to support a collar or cuff or a price-card.

The whole device forms a very complete and stable article of its character and is of neat appearance.

The coils of the arms E F G firmly hold the collars or other article clamped thereon and effectually prevent their accidental displacement, which is a desirable feature of the exhibitor.

In Fig. 2 we have illustrated a construction in which the arms E F G are adjustable. In this form the frame D is similar to that of the form shown in Fig. 1, except that it terminates at its lower end at $d^4$, at which point it is secured to the main frame A. The arms E E and F F are each provided with a ring or base, $e'$ or $f'$, which slides vertically on the uprights $a$ of the main frame, and by means of a set-screw, $e^2$ or $f^2$, the arms may be fixed at any point on the said upright. The arm G is free to slide in a vertical aperture in the cross-bar $a'$ of frame A and is fixed at any desired elevation by a set-screw, $g'$, working in said cross-bar and binding against the adjustable arm G.

Having thus described our invention, we claim as new, and desire to secure by Letters Patent—

1. In an exhibitor, the combination, with an open frame having transverse openings or bearings in its side bars and a rest connecting said side bars below said openings or bearings, of transverse arms passing through said openings or bearings and having inwardly-projecting clamping-hooks at their outer ends, substantially as set forth.

2. The combination, with the main frame provided with a rest near the bottom for supporting a shirt, of the clamps formed of wires secured to the main frame within the same, and formed with the clamps $d^2$, extending through the main frame through apertures formed therein, substantially as described.

3. An exhibitor for shirts, collars, cuffs, and the like, consisting of the frame A, provided with a rest near its bottom, clamps projecting from its sides, and outwardly-projecting arms having coils at their ends, substantially as herein shown and described.

4. An exhibitor comprising a wire easel or frame having a transverse rest connecting its side bars, transversely-adjustable clamps on said side bars above the said rest, sliding collars on the side bars above and below said clamps, and outwardly-projecting arms secured to said collars, and means for securing the collars in their adjusted positions, substantially as set forth.

GEORGE HUBBARD HARDY.
ROLLIN ALGER BALDWIN.

Witnesses:
NED T. WALLACE,
CHAS. H. CUSHMAN.